United States Patent
Raz

(10) Patent No.: US 6,292,827 B1
(45) Date of Patent: *Sep. 18, 2001

(54) INFORMATION TRANSFER SYSTEMS AND METHOD WITH DYNAMIC DISTRIBUTION OF DATA, CONTROL AND MANAGEMENT OF INFORMATION

(75) Inventor: Uri Raz, Fairlawn, NJ (US)

(73) Assignee: Shore Technologies (1999) Inc., Tel Aviv (IL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/879,859

(22) Filed: Jun. 20, 1997

(51) Int. Cl.[7] .................................... G06F 15/16
(52) U.S. Cl. ...................... 709/217; 709/218; 709/219
(58) Field of Search .................... 709/217, 218, 709/219, 223, 224; 707/10, 1; 345/330; 370/254

(56) References Cited

U.S. PATENT DOCUMENTS

| | | | |
|---|---|---|---|
| 5,204,897 | * 4/1993 | Wyman | 380/4 |
| 5,581,552 | * 12/1996 | Civanlar et al. | 370/396 |
| 5,774,660 | * 6/1998 | Brendel et al. | 709/201 |
| 5,799,318 | 8/1998 | Cardinal et al. | 707/104 |
| 5,802,292 | 9/1998 | Mogul | 395/200.33 |
| 5,802,296 | 9/1998 | Morse et al. | 395/200.38 |
| 5,802,306 | 9/1998 | Hunt | 395/200.58 |
| 5,826,239 | * 10/1998 | Du et al. | 705/8 |
| 5,826,265 | * 10/1998 | Van Huben et al. | 707/8 |
| 5,896,530 | * 4/1999 | White | 707/1 |
| 5,918,049 | * 6/1999 | Syvaniemi | 709/104 |
| 5,949,998 | * 9/1999 | Fowlow et al. | 395/701 |
| 5,966,702 | * 10/1999 | Fresko et al. | 707/1 |

* cited by examiner

Primary Examiner—Zarni Maung
Assistant Examiner—Jason D. Cardone
(74) Attorney, Agent, or Firm—Clifford Chance Rogers & Wells LLP

(57) ABSTRACT

An information transfer network, comprising: a plurality of client terminals which comprise a presentation system having a control and management agent system; a plurality of servers which comprise a database system and an application system, and a control and management agent system; a request broker system which permits the exchange of information between said client terminals and said servers through a communication path between said terminal and said server, and an information management system for dynamically controlling the location, access and transfer of information between said client terminals and said servers through a plurality of communication paths connecting said control and management agent system of each of said client terminals and servers to said information management system.

38 Claims, 18 Drawing Sheets

FLOWCHART OF SERVER

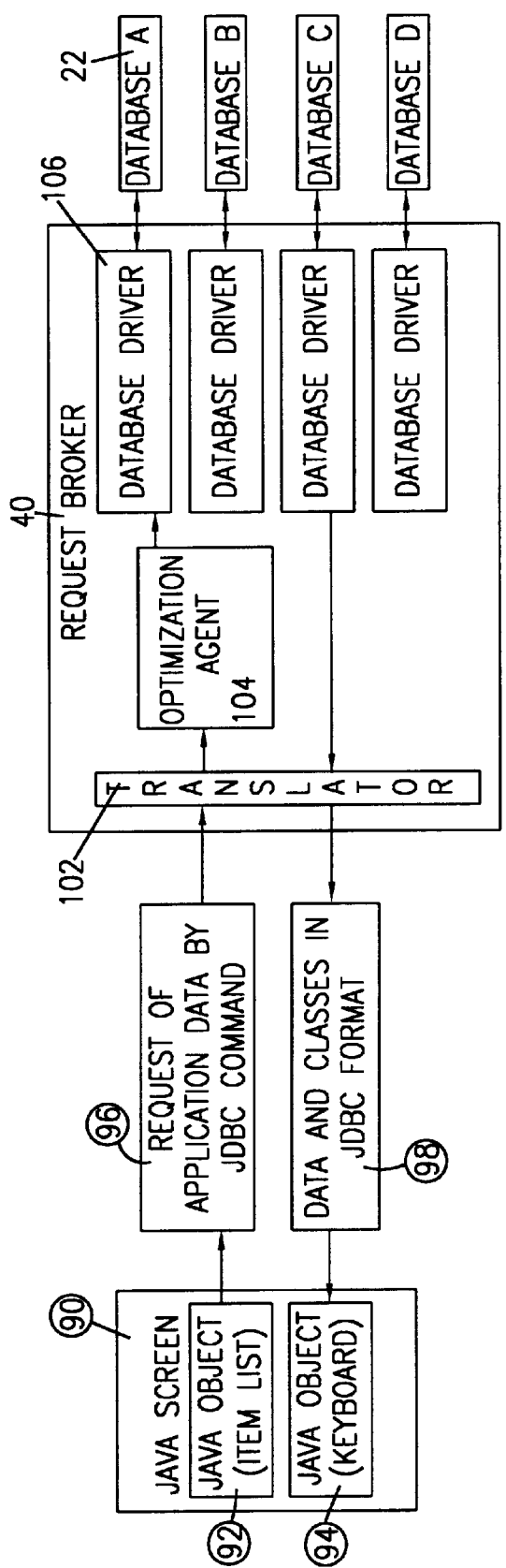

TABLE 1: THE AMETA-DATA@MODEL – THIS IS THE STRUCTURE OF THE SYSTEM:

| OBJECT_TYPES | | | PROPERITY_TYPES | | | |
|---|---|---|---|---|---|---|
| ID | NAME | ... | ID | NAME | DDT_ID (DATA TYPE) | ... |
| 1 | CLASSIFICATION | ... | 1 | ICON | BLOB | ... |
| 2 | COMPANY | ... | 1 | COMPANY'S PROFILE | TEXT | ... |
| | | | 2 | LOGO | BLOB | ... |
| | | | 3 | VIDEO | BLOB | ... |
| | | | 4 | ESTABLISHMENT DATE | DATE | ... |
| 3 | PRODUCTS | ... | 1 | DESCRIPTION | TEXT | ... |
| | | | 2 | PICTURE | BLOB | ... |

*FIG. 10*

TABLE 2: OBJECT LINK TYPES

LINK_TYPES

| OBT_ID_PARENT (PARENT OBJECT TYPE) | OBT_ID_CHILD (CHILD OBJECT TYPE) | ID | NAME_DOWN | NAME_UP |
|---|---|---|---|---|
| 1 (CLASSIFICATION) | 1 (CLASSIFICATION) | 1 | SUB_CLASSES | SUPER-CLASS |
| 1 (CLASSIFICATION) | 2 (COMPANY) | 2 | COMPANIES IN THIS CLASS | COMPANY=S CLASS |
| 2 (COMPANY) | 2 (COMPANY) | 3 | DAUGHTERS COMPANIES | MOTHER COMPANY |
| 2 (COMPANY) | 3 (PRODUCT) | 4 | COMPANY=S PRODUCTS | PRODUCT=S COMPANY |

FIG. 11

TABLE 3: THE DATA

| OBJECTS | | OBJECT_NAMES | | OBJECT_PROPERTIES | | *_PROPERTIES | |
|---|---|---|---|---|---|---|---|
| OBT_ID (OBJECT TYPE) | ID | L N G_I D (LANGUAGE) | NAME | P R T _ I D (PROPERTY TYPE) | PROP.ID | L N G_I D (LANGUAGE) | CONTENTS |
| 1 (CLASSIFICATION) | 1 | 1 (ENGLISH) | COMPUTERS | | | | |
| | | 2 (HEBREW) | MACHSHEVIM | | | | |
| 1 (CLASSIFICATION) | 2 | 1 (ENGLISH) | SOFTWARE | | | | |
| | | 2 (HEBREW) | TOCHNA | | | | |
| 1 (CLASSIFICATION) | 3 | 1 (ENGLISH) | HARDWARE | | | | |
| | | 2 (HEBREW) | CHOMRA | | | | |
| 1 (CLASSIFICATION) | 4 | 1 (ENGLISH) | FOOD | | | | |
| | | 2 (HEBREW) | MAZON | | | | |
| 1 (CLASSIFICATION) | 5 | 1 (ENGLISH) | DAIRY PROD. | | | | |
| | | 2 (HEBREW) | MUZREI HALAV | | | | |
| 1 (CLASSIFICATION) | 6 | 1 (ENGLISH) | MEAT PROD. | | | | |

| | | | | | |
|---|---|---|---|---|---|
| | 2 (HEBREW) | MUZREI BASAR | | | |
| 2 (COMPANY) 3 2 | 1 (ENGLISH) | G.S.A. | | | |
| | 2 (HEBREW) | M.Z.A. | | | |
| 2 (COMPANY) 3 3 | 1 (ENGLISH) | G.S. | 1 (PROFILE) | 1 (ENGLISH) | "TEXT 1" |
| | | | | 2 (HEBREW) | "MELEL 1" |
| | 2 (HEBREW) | M.Z. | 1 (PROFILE) | 2 1 (ENGLISH) | "TEXT 2" |
| | | | | 2 (HEBREW) | "MELEL 2" |
| | | | 2 (LOGO) | 3 1 (ENGLISH) | GS |
| | | | | 2 (HEBREW) | |
| | | | 3 (VIDEO) | 4 1 (ENGLISH) | "VIDEO ENG" |
| | | | | 2 (HEBREW) | "VIDEO HEB" |
| | | | 4 (EST.DATE) | 5 1 (ENGLISH) | 1991 |
| | | | | 2 (HEBREW) | |
| 2 (COMPANY) 3 4 | 1 (ENGLISH) | MICROSOFT | | | |
| | 2 (HEBREW) | MICROSOFT. | | | |

| 2 (COMPANY) | 3 5 | 1 (ENGLISH) | IBM | | | |
| --- | --- | --- | --- | --- | --- | --- |
| | | 2 (HEBREW) | IBM | | | |
| | | | | | | |
| 3 (PRODUCT) | 5 7 | 1 (ENGLISH) | MULTIMEDIA STATIONS | | | |
| | | 2 (HEBREW) | E M D O T MULTIMEDIA | | | |
| 3 (PRODUCT) | 5 8 | 1 (ENGLISH) | TERMINALS | | | |
| | | 2 (HEBREW) | MSOFIM | | | |

*FIG. 12C*

ILLUSTRATION OF CLASSIFICATION TREE AND ASSOCIATED DATA ITEMS
THE CONTENTS OF OBJECT_LINKS TABLE IS ILLUSTRATED BELOW:
```
*
*
/COMPUTERS
*   *
*   /SOFTWARE                      --TYPE 1 LINK
*   *   *
*   *   /CSA                       --TYPE 2 LINK
*   *   *  *
*   *   *  C                       --TYPE 3 LINK
*   *   *   *
*   *   *    /MULTIMEDIA STATIONS  --TYPE 4 LINKS
*   *   *
*   *   *
*   *   /C                         --TYPE 2 LINK
*   *   * *
*   *   * /MULTIMEDIA STATIONS     --TYPE 4 LINKS
*   *   * /
*   *   *
*   *   *
*   *   /M                         --TYPE 2 LINK
*   *   * *
*   *   *
*   *   *
*   *   *
*   *   |                          --TYPE 2 LINK
*   *    *
*   *    /TERMINALS
*   *    / ...
*   *    . ...
*   *
*   HARDWARE                       --TYPE 1 LINK
*       *
*       |                  --TYPE 2 LINK
*       *
*       /TERMINALS                 --TYPE 4 LINK
*       / ...
*       . ...
*
*
*
FOOD
  *
  /DAIRY PRODUCTS
  *
  MEAT PRODUCTS
```

FIG. 13

INFORMATION TRANSFER SYSTEMS AND METHOD WITH DYNAMIC DISTRIBUTION OF DATA, CONTROL AND MANAGEMENT OF INFORMATION

BACKGROUND OF THE INVENTION

The transfer of information using the Internet is not centrally managed. The Internet is an amalgam of many networks and many host computers. Using the Internet, information is stored on host servers and is requested by reference to a static address location of that host server. The Internet does not redistribute data according to user requests. Furthermore, the Internet is organized into a hierarchy of two tiers, a client tier and a server tier. Thus, the Internet does not employ efficient management of the location of information. Furthermore, the Internet does not enjoy the advantages of a four tier system and its system resources are not managed.

The Internet is not a consistent behaving network. The traffic and load on parts of its infrastructure can largely vary, forcing the response time to be inconsistent, unstable and unexpected, so the traditional Internet tools (servers, clients) can not be used "as is", if a professional level of interactivity is required.

Traditional Local Area Networks ("LANs") or Wide Area Networks ("WANs") that employ dedicated infrastructure gained stability and dependability based on the assumption that the users, the amount of users and the content that ran over the network were expected. In our case that assumption can not be made, thus eliminating the use of traditional LANs or WANs.

In view of the aforementioned short-comings of known data networks including the Internet, it is an object of the present invention to provide a secure, reliable network for information transfer with enhanced performance due to dynamic distribution of information.

SUMMARY OF THE INVENTION

An information transfer network, comprising: a plurality of client terminals which comprise a presentation system having a control and management agent system; a plurality of servers which comprise a database system, an application system, and a hierarchical control and management system; a request broker system which permits the exchange of information between said client terminals and said servers; and an information management system for dynamically controlling the location, access and transfer of information between said client terminals and said servers through a plurality of communication paths utilizing said control and management agent system of each of said client terminals and servers with said information management system.

In general, in one aspect, the invention features an information transfer network system that includes client terminals, servers, a request broker system and an information management system. The client terminals include a presentation system and a control and management agent system. The servers include a database system, an application system, and a control and management agent system. The request broker system permits an exchange of information between the client terminals and the servers through communications paths between each of the terminals and the servers. The information management system dynamically controls the location, access and transfer of information between client terminals and the servers through the communication paths connecting the control and management agent system of each of the client terminals and the servers to the information management system.

In general, in another aspect, the invention features a system for transferring data over a network. The system includes client terminals, server, an operations management system, and an interfacing system that are each connected to the network. The operations system monitors and stores characteristic data about the client terminals and servers. The interfacing system dynamically distributes data between the servers and the terminals as a function of the characteristic data such that a portion of the data is stored at the client terminals.

In general, in another aspect, the invention features a method for transferring data over a network. The method includes establishing a data communication between client terminals and servers, generating a database of characteristic data associated with the client terminals and servers, and dynamically distributing data between the client terminals and servers as a function of the characteristic data stored in the database such that a portion of the distributed data resides at the client terminals and another portion resides at the servers.

In general, in another aspect, the invention features computer readable media comprising instructions for causing a computer system to implement methods of the invention.

Implementations may include one or more of the following features. The presentation system may include a browser, and an external device (such as a scanner, audio device, video device, fingerprint device, credit or debit or smart card device). The server may include a smart decompression engine. The information management system can include mathematical modeling system, an optimization systems, and a configuration database system.

Implementations also may include one or more of the following features. The network may include LANnets, a WANnets, the Internet and/or an Intranet. Client terminals can include personal computers, stand-alone terminals, and organizational computers. The stand-alone terminal may include hardware for loading smart cards, reading magnetic cards, and processing videographics. The servers can include information servers, transactional servers and/or an external server. A transactional server may perform financial and/or personal transactions. The network can include a graphical user interface for displaying a portion of the characteristic data on client terminals. The system may be operable with a plurality of third party applications. The interfacing system may be a request broker system.

The system can include a telecommunications device connected to the network for accessing data from the servers. The system can include an optimization system for distributing data between clients and servers. The characteristic data may include static or dynamic parameters associated with the terminals and a usage pattern associated with the terminals.

BRIEF DESCRIPTION OF THE DRAWINGS

FIG. 5c is a block diagram of the request broker data model.

FIG. 10 is a Table of the database example depicting the structure of the database.

FIG. 11 is a Table of the database example depicting the object link types of the database.

FIG. 12a is part a of a table of the database example depicting the data.

FIG. 12b is part b of a table of the database example depicting the data.

FIG. 12c is part c of a table of the database example depicting the data.

FIG. 13 is an illustration of a classification tree and associated data items of a database example.

DETAIL DESCRIPTION OF INVENTION

The present invention relates generally to the field of information transfer. More particularly, the present invention relates to dynamic data transfer and management of information. Specifically, the present invention relates to a method of dynamic information transfer and management allowing control or application intelligence and data content to be dynamically redistributed between data servers and client terminals including publicly located client terminals.

In one embodiment one or a plurality or client terminal or servers are used. The terminals may be connected to public or private networks.

Figure 1:
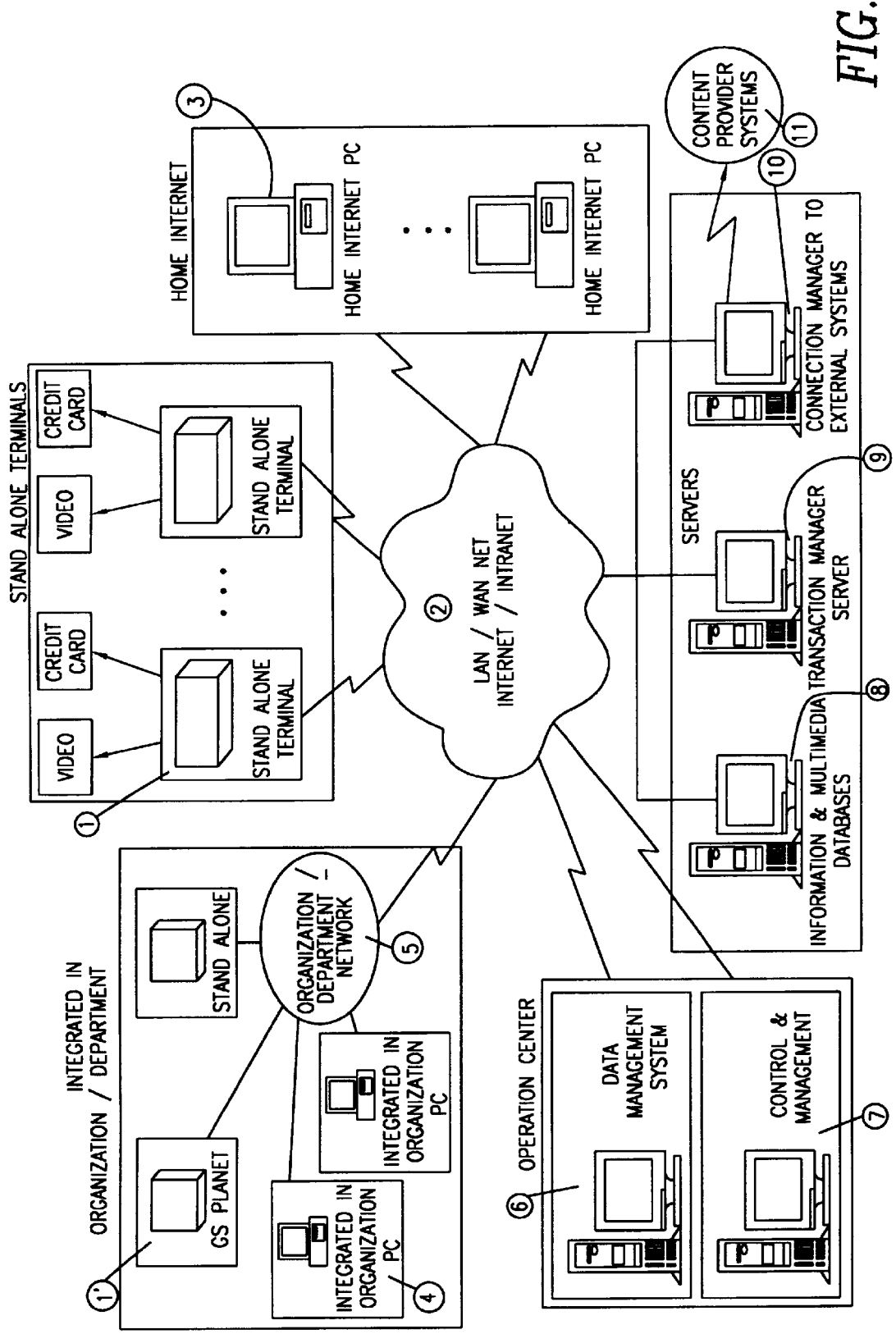
FIG. 1 is a constructional diagram of the Information Transfer Network System.

Referring to FIG. 1 shows a block diagram of the first embodiment of the present invention. Stand alone client terminals (1) are shown connected to the network backbone (2). Home Internet PC client terminals (3) are also shown connected to the network backbone (2). Organization network PC terminals (4) are shown connected to an organization network (5) which is connected to the network backbone (2). Stand alone client terminals (1') are shown connected to the organization network (5). The network data management systems (6) are shown connected to the network backbone (2). The network control and management systems (7) are shown connected to the network backbone (2). The network information database servers (8) are shown connected to the network backbone (2). The network transaction manager database servers (9) are shown connected to the network backbone (2). The network external system connection manager servers (10) are shown connected to the network backbone (2). The Content Provider external systems (11) are shown connected to the network backbone (2).

Home Internet PC client terminals (3) connected to the network backbone (2), using the HTTP protocol, starts a session by requesting a secure or non secure (depending on the specific application) connection to the information database servers (8) via the network backbone (2). As soon as the requesting terminal is verified and identified the connection to the information database server is established. The said terminal is then requesting a specific application's information from the said server. The application's intelligence is the loaded onto the terminal either from the local disk or from the said server. According to the nature of the application and type of information requested the said server and the application running on the client decide whether a "standard" HTTP connection is adequate or is a secure HTTP connection is required. The secure HTTP connection is used for financial transactions or personal information.

As soon as the type of connection is decided between the said client and the said server an "application channel" is established. The application channel means that according to the user's interaction with the application the appropriate information will be called from the database on the information server, transferred and displayed on the said terminal.

Organization network PC terminals (4) go through the same mentioned procedure but instead of being connected directly to the internet/intranet they are connected via the organization network that is connected to internet infrastructure.

Stand alone client terminals (1, 1') on any location go also through the same mentioned procedure. The difference between them and the other types of terminals is the fact that they have additional hardware & peripherals that extends their capabilities like load smart cards, read magnetic cards, show video clips, etc. . . .

Whenever financial or personal transaction is required, the information server connects the application with the transaction manager server (9) via the information server. According to the required transaction, it is either processed locally on the transaction manager server (9) or a remote connection to third party transaction clearing system is executed.

The network external system connection manager servers (10) shown connected to the network backbone (2) is the gateway to other content Provider external systems (11) shown connected to the network backbone (2). When an application requires information that is not on the network information database servers (8) but that information can be reached at some other content provider system, the network information database servers (8) establishes a connection via the external system connection manager servers (10) to the said content provider (11) to get the required information.

The network data management system (6) shown connected to the network backbone (2) handles the management of the existing data and new data entry tasks. A copy of the information database is located on the said system. This database is not the "formal", active database but a "scratch" copy for maintenance. On predefined schedules the database on the network data management system, updates the working "formal" database on the network information database servers (8).

Figure 2:
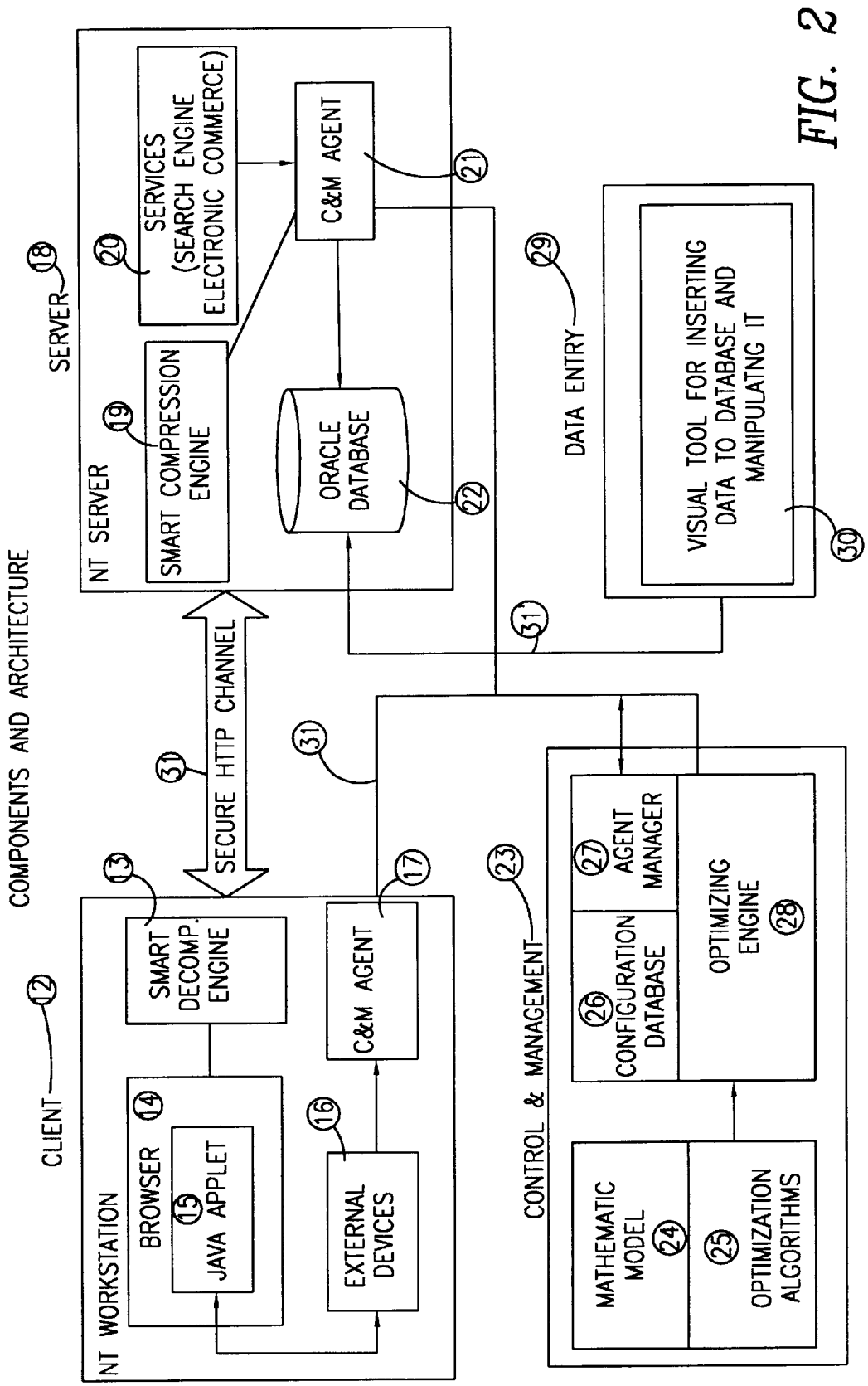
FIG. 2 is a block diagram of the Information Transfer Network System components and architecture.

Referring to FIG. 2 shows a more detailed block diagram of the components and architecture of the information transfer network depicted in FIG. 1. The Client (12) comprises Smart Decompression Engine (13) connected to Browser (14) which includes Java Applet (15). Browser (14) is connected to External Devices (16) which are connected to Control and Management Agent (17). Client (12) is connected to Secure HTTP Channel (31) which is connected to Server (18). Server (18) comprises Smart Compression Engine (19) connected to a Control and Management Agent (21) which is connected to services and a database. Control and Management system (23) includes Configuration Database (26), Agent Manager (27) and Optimizing Engine (28) which includes Mathematical model (24) and Optimization Algorithms (25). Data Entry System (29) includes Visual database manipulation tool (30).

Figure 3:
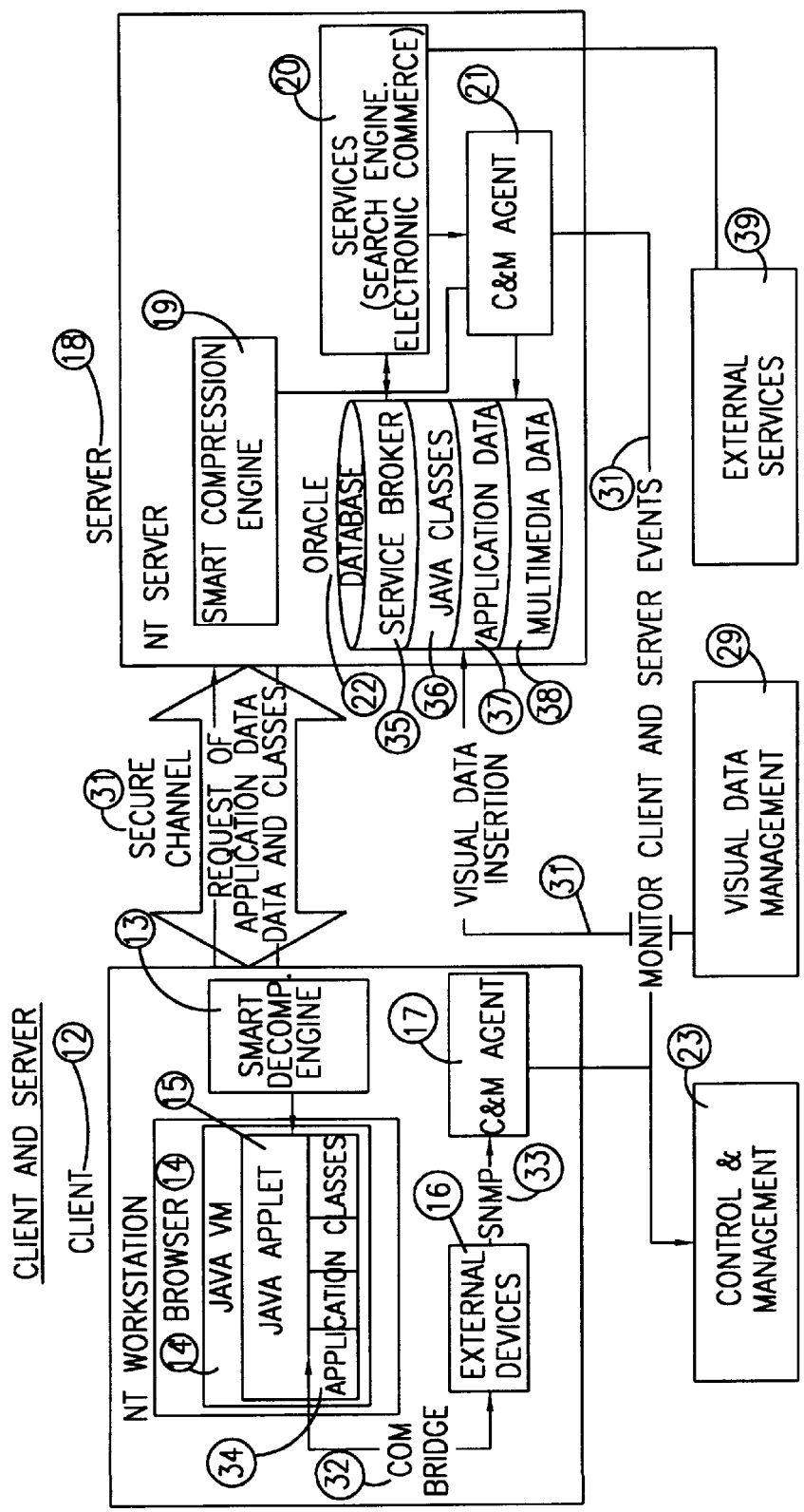
FIG. 3 is a block diagram of the Information Transfer Network System client and server.

Referring to FIG. 3 shows a more detailed block diagram of the Browser (14), Java Applet (15), Secure HTTP Channel (31) and Database (22) components and architecture of the information transfer network components and architecture depicted in FIG. 2. Browser (14) comprises Java Virtual Machine (14'). Java Applet (15) comprises Application Classes (34). External Devices (16) are connected to Java Applet (15) by Com Bridge (32). External Devices (16) are connected to Control and Management Agent (17) by SNMP (33). Visual Data Management (29) is connected to database (22) by Visual Data Insertion channel (31'). External Services (39) are connected to Services (20). Database (22) comprises Service Broker (35), Java Classes (36), Application Data (37) and Multimedia Data (38).

Figure 4:
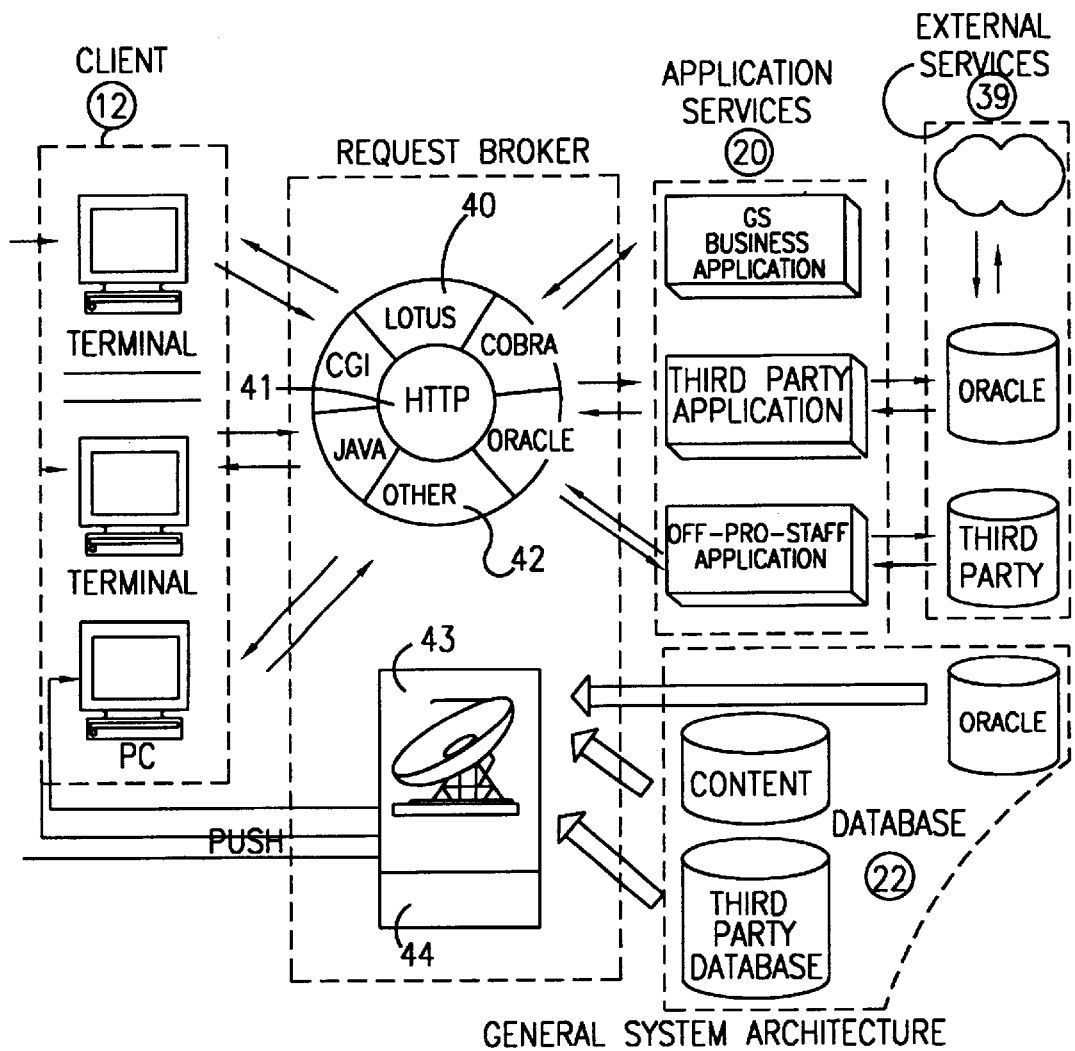
FIG. 4 is a constructional diagram of the Information Transfer Network System general system architecture.

Referring to FIG. 4 shows a constructional diagram of The Information Transfer Network System general system architecture. Request Broker (40) comprises a HTTP Request Broker (41) connected to Request Broker Interface Modules (42) and a Content and Software Transmitter (43) connected to the Profiles Manager (44). The Request Broker Interface Modules (42) are connected to Clients (12) and Application Services (20). Content and Software Transmitter (43) is connected to Clients (12) and Databases (22). External Services (39) are connected to Application Services (20).

Figure 5:
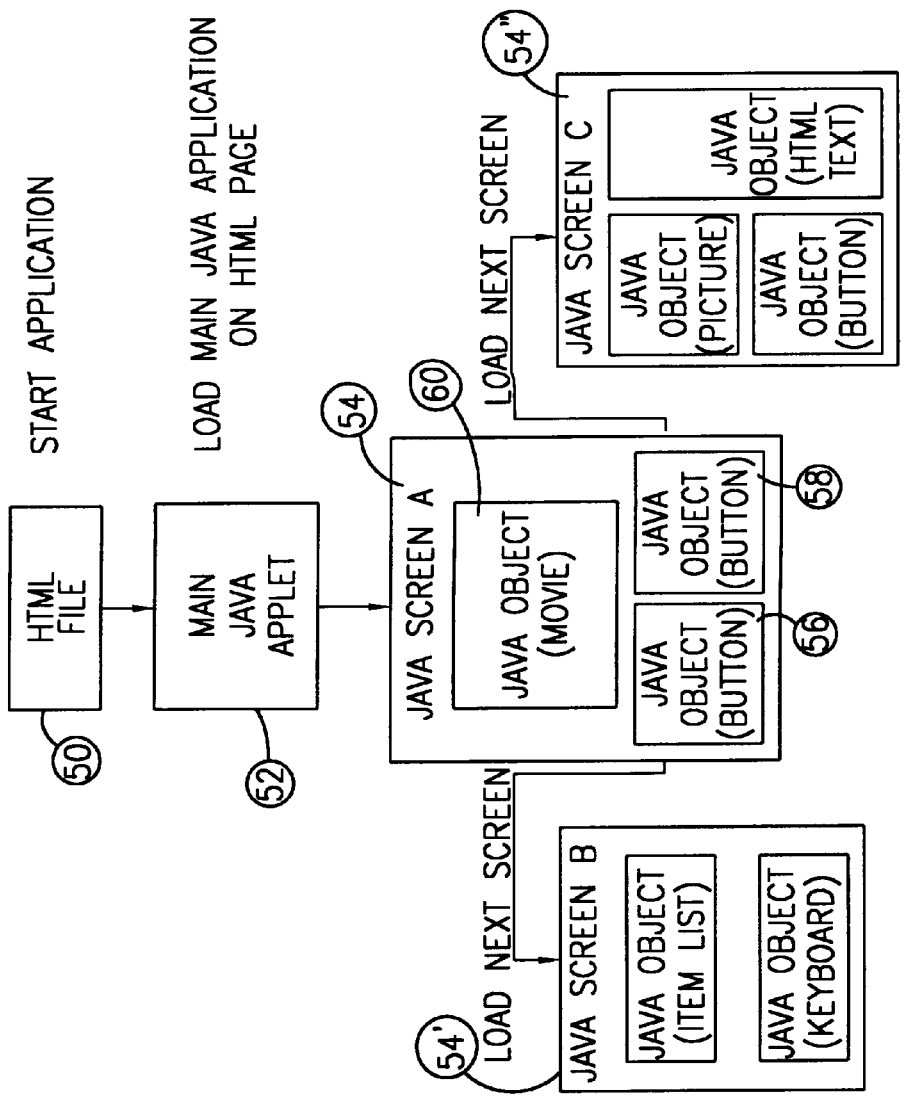
FIG. 5 is a block diagram and flowchart of the processing sequence of presentation system.

Referring to FIG. 5 shows a block diagram and flowchart of the processing sequence of the presentation system. The presentation system will start application by executing HTML File (50) and will load main Java application (52). The presentation system using main java applet (52) will present Java screen A (54) to the user. Java screen A (54) comprises Java object—Movie (60), Java object-Button (56) and Java object-Button (56). If Java object-button (56) is activated, the presentation system will load Java Screen B (54'). If Java object-button (58) is activated, the presentation system will load Java Screen C (54").

Figure 5A:
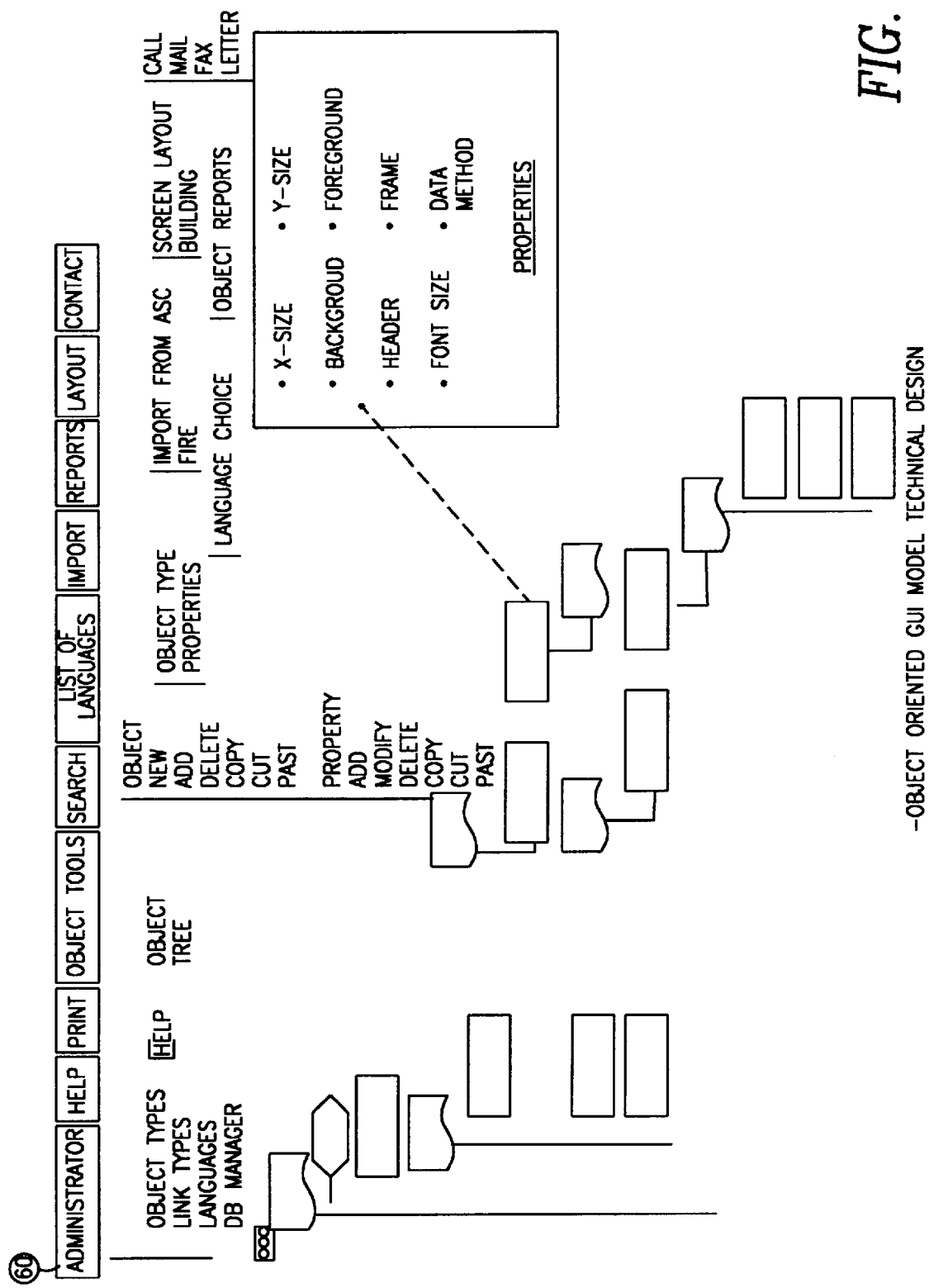
FIG. 5a is a block diagram of the object oriented data model used to transfer information between the presentation system and the request broker.

Referring to FIG. 5a shows a block diagram of the data model used to transfer information between the presentation system and the request broker. GUI Object (60) comprises various data objects to be presented to the presentaion system.

Figure 5B:
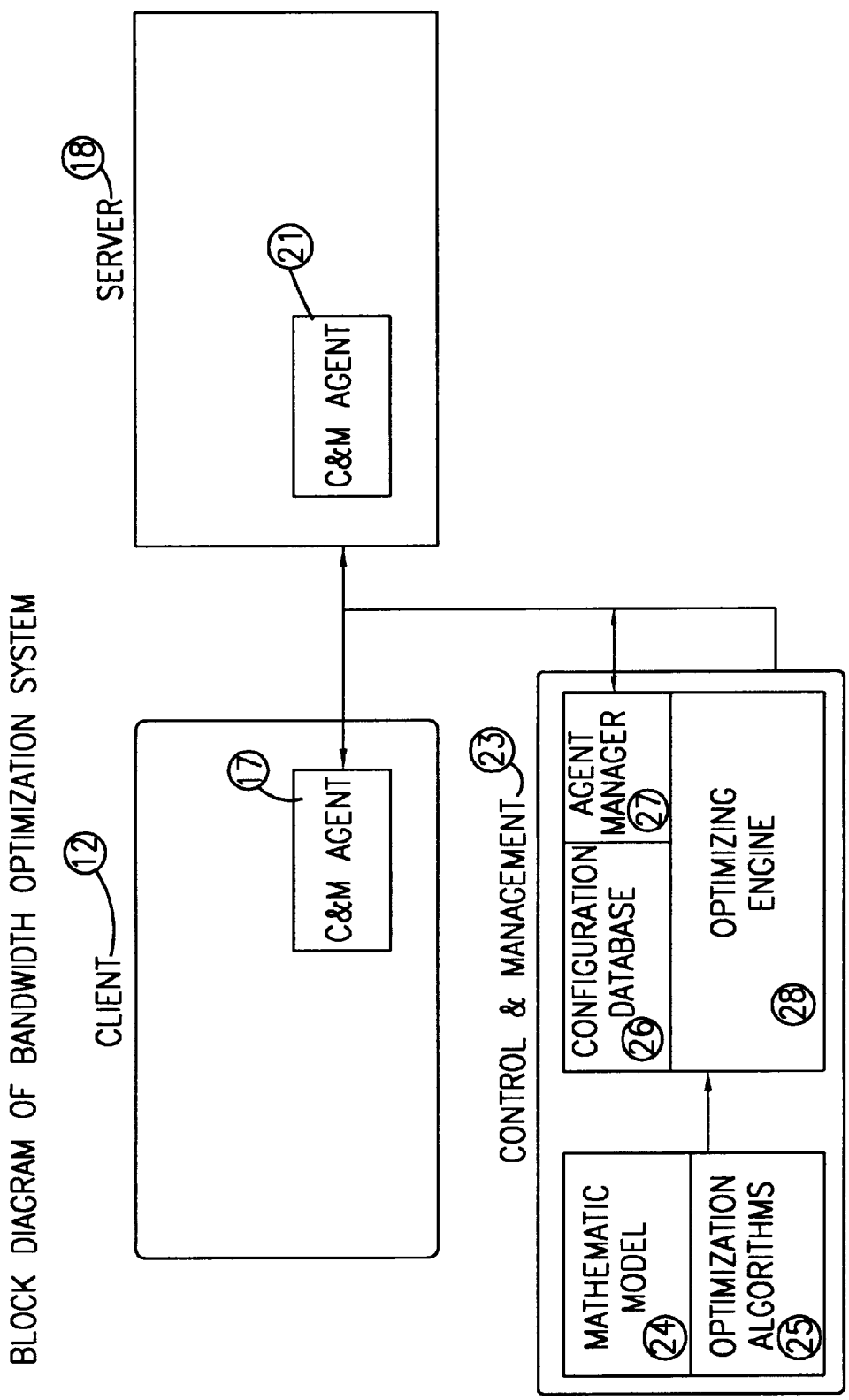
FIG. 5b is a block diagram of the bandwidth optimization system.

Referring to FIG. 5b shows a block diagram of the bandwidth optimization system. The Client (12) comprises Control and Management Agent (17). Server (18) comprises Control and Management Agent (21). Control and Management system (23) comprises Configuration Database (26), Agent Manager (27) and Optimizing Engine (28) which includes Mathematical model (24) and Optimization Algorithms (25). Control and management (23) is connected to the Client (12) and server (I 8) using Agent Manager (27) connected to C&M Agent (17) and C&M Agent (21)

Referring to FIG. 5c shows a block diagram of request broker data model. Java Screen (90) comprises Java Object-Item List (92) and Java Object-Keyboard (94). Request Broker (40) is connected to database (22) using Database Driver (106). Request Broker (40) is connected to presentation system through Java Screen (90) using Optimization Agent (104) and Translator (102).

Figure 6:
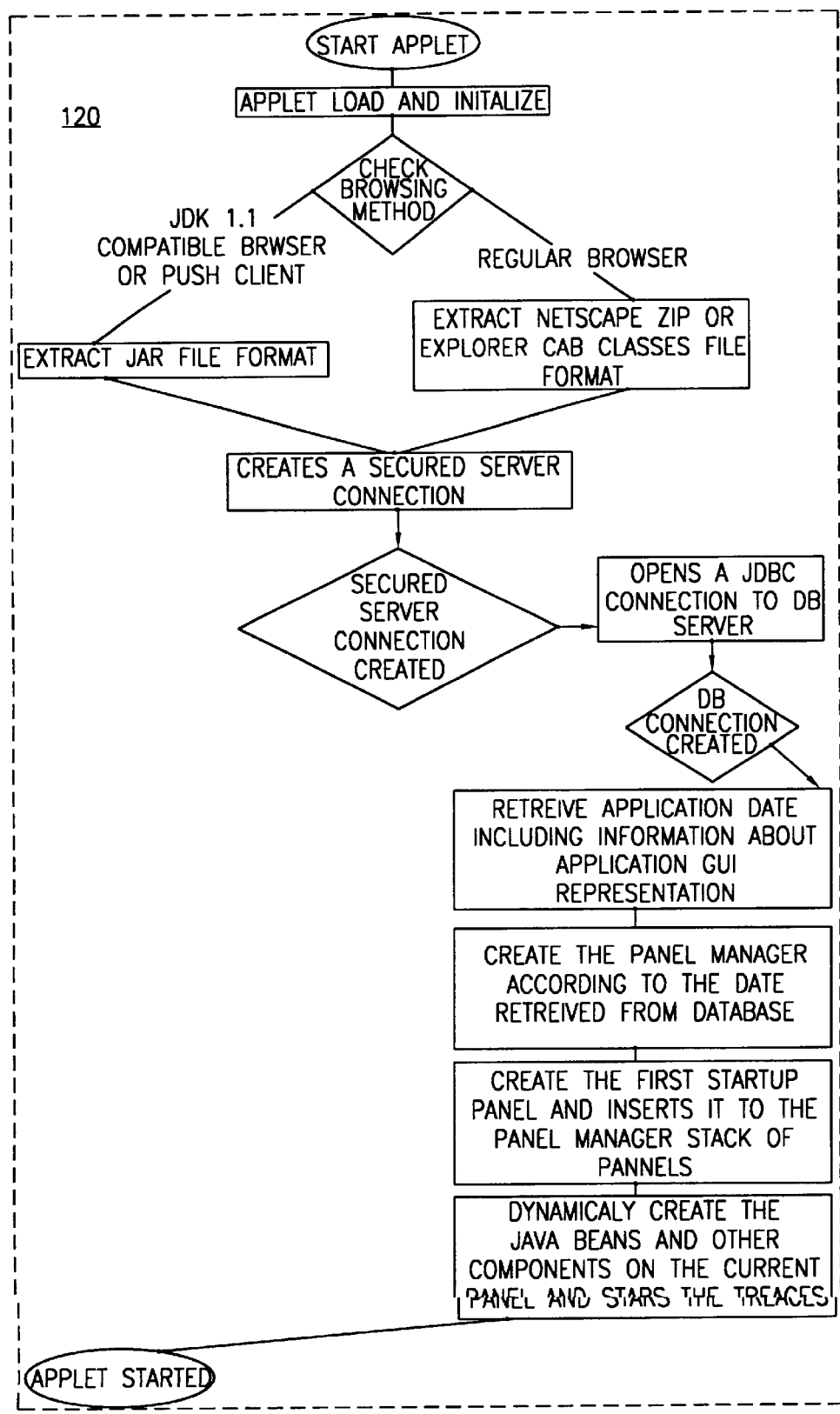
FIG. 6 is a block diagram of the JAVA Applet for the Information Transfer Network System client terminals.

Referring to FIG. 6 shows the Block Diagram (120) of the JAVA Applet for the Information Transfer Network System client terminals.

Figure 7:
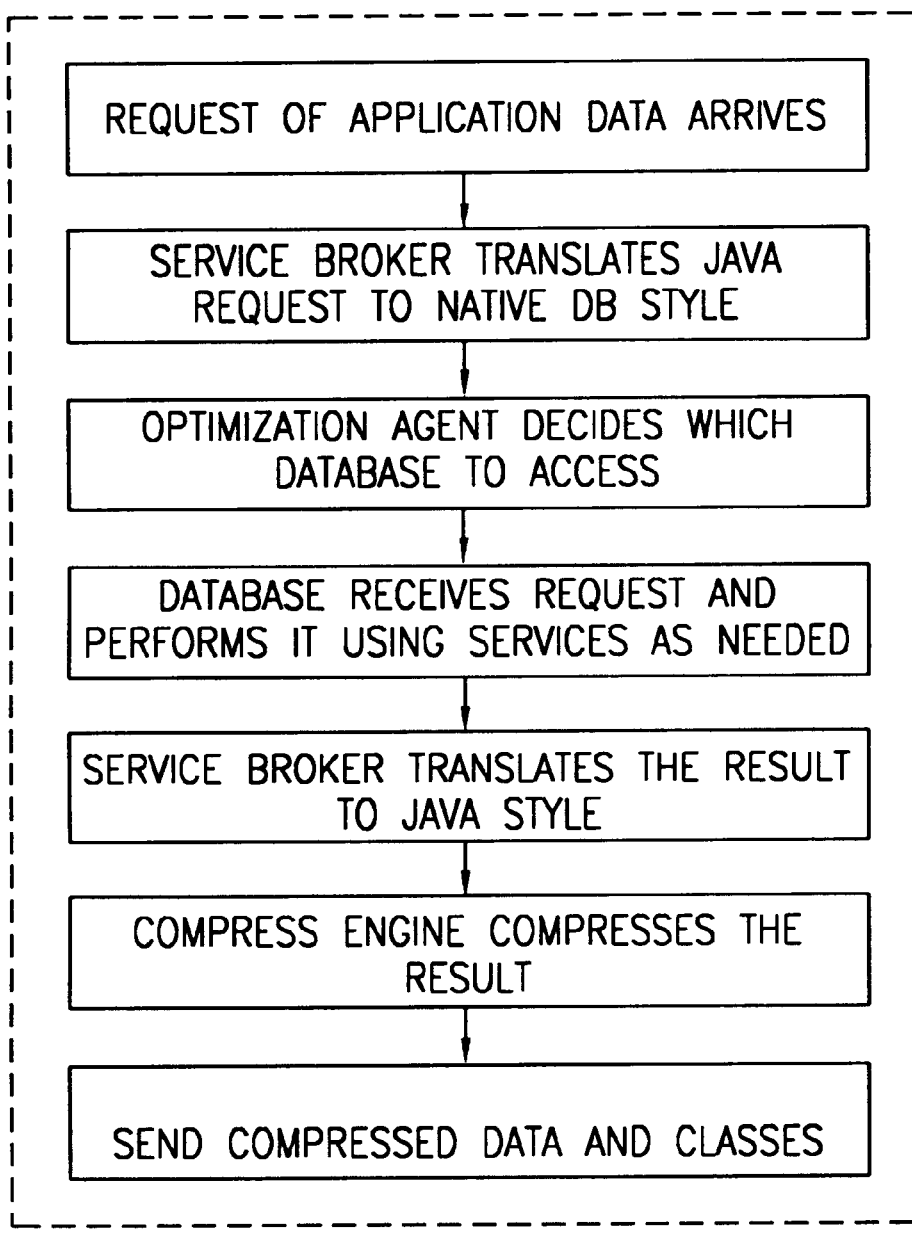
FIG. 7 is a flowchart of the server.

Referring to FIG. 7 shows a flowchart of the processing sequence of the applications system of server.

Figure 8:
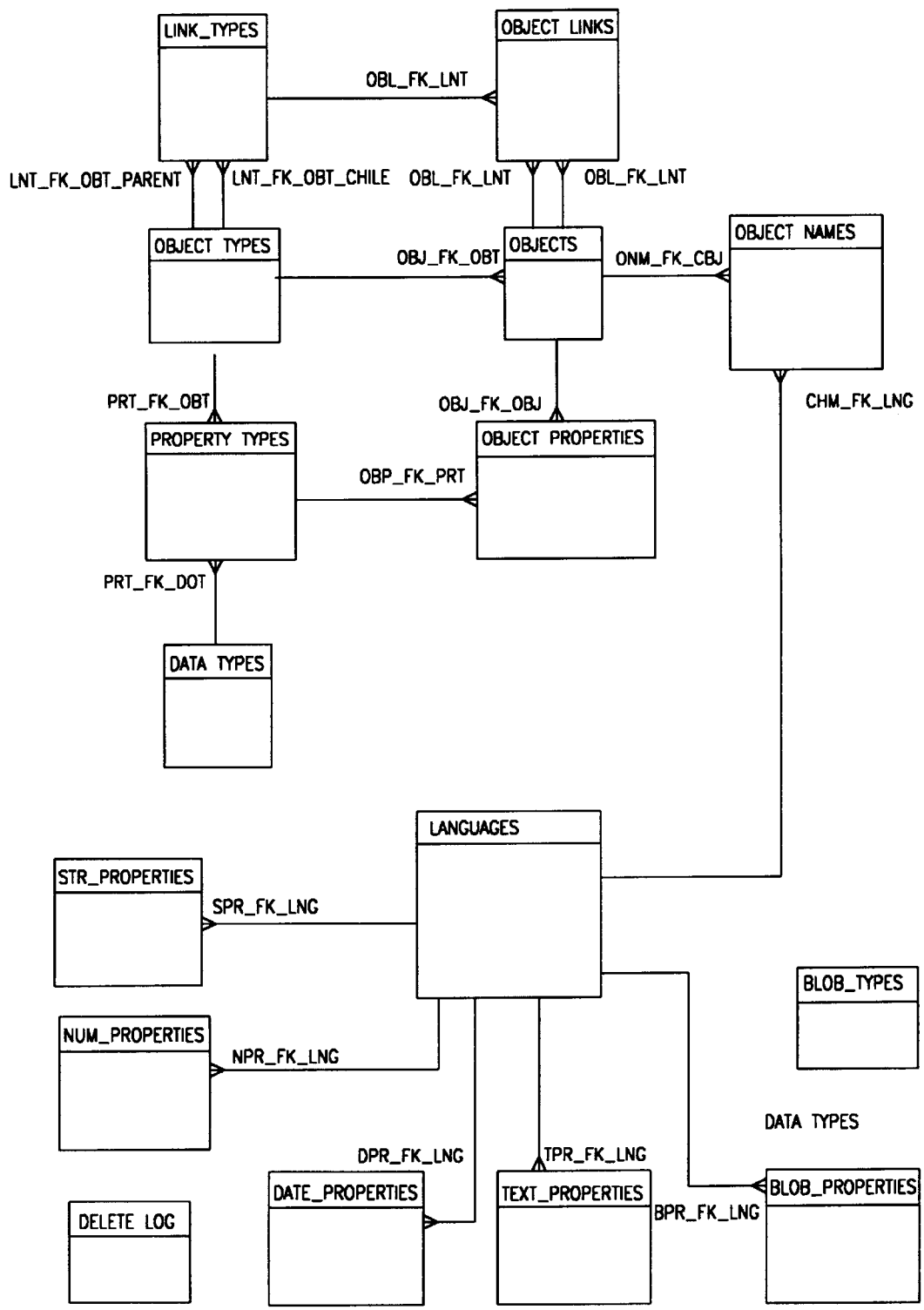
FIG. 8 is a block diagram of the generic database design.

Referring to FIG. 8 shows a description of the items shown on block diagram of the generic database design. The basic concept of the database model is based on 3 components: OBJECTS, the PROPERTIES of each object and the LINKS between the objects. The database model contains the META-DATA which represents the structure of the data and determines the laws of data including OBJECT_TYPES: the types that the objects can be of, PROPERTY_TYPES: the types of properties each object can has, DATA_TYPES: the data types (numeric, string, etc.) a property can be of, LINK_TYPES: the kinds of links that can be between object types, and LANGUAGES: the different languages that the data can be translated to.

Figure 9:
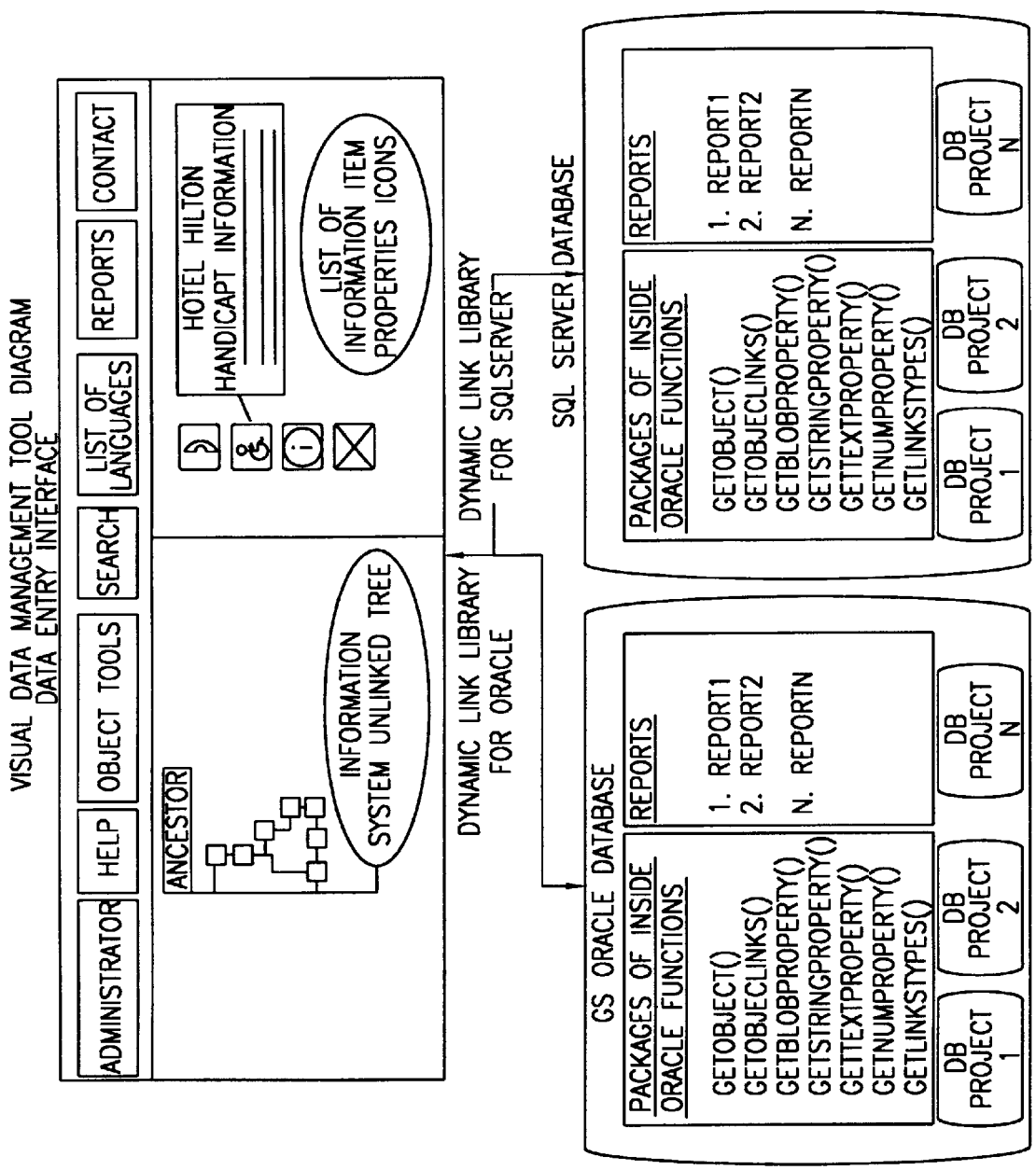
FIG. 9 is a block diagram of the visual data management tool.

FIG. 9 is a block diagram of the visual data management tool.

FIG. 10 is a Table of the database example depicting the structure of the database.

FIG. 11 is a Table of the database example depicting the object link types of the database.

FIG. 12a is part a of a table of the database example depicting the data.

FIG. 12b is part b of a table of the database example depicting the data.

FIG. 12c is part c of a table of the database example depicting the data.

FIG. 13 is an illustration of a classification tree and associated data items of a database example.

This invention provides an Information Transfer Network system which is a comprehensive and integrated system that offers business organizations a platform for presenting visual information (multimedia), performing business transactions, and providing advanced services to customers through publicly accessible terminals, or home PCS connected to a network (Internet, Intranet). FIG. 1 represents the main building blocks of the Information Transfer Network system. The Information Transfer Network system maximizes the availability of all systems and services, manages thousands of terminals, servers, and network facilities and minimizes the cost of ownership (TCO) of the terminals and network.

The Presentation Tier or layer of the system model includes a Graphical User Interface (GUI). The GUI Multimedia Components of the Information Transfer Network system include: I a) JAVA-HTML Classes that enable the use of HTML within Java applets, including rich text format, pages layout, and hyperlinks (between items in Java application); b) Controlled WWW Links—Java applets that can completely control a standard HTML session. This includes replacing browser toolbars and menus with Java navigation toolbars, capturing and filtering all hyperlinks; c) Peripherals interaction applets;

The Information Transfer Network system utilizes Bandwidth Optimization Methods for compression and decompression of GUI components and Java Classes.

The Information Transfer Network system utilizes a Forms Generator/Processor that includes: a) Form Filling system that enables users to complete self-service forms on screen for electronic submission or printing; and b) Validity Checking system—Forms can have embedded validity checking, which runs on the client side.

The Information Transfer Network system utilizes Authoring and Data Management Tools including: a) Application Generator—Rapid Application Development (RAD) tools for building self-service applications; b) Object-Oriented Dynamic Display System that Reads GUI objects from databases on-the-fly, and displays them according to Properties and Methods; and c) Visual Data Management—Visual tools for organizing, classifying, and maintaining data items.

The Information Transfer Network system utilizes Database Technology that includes a Generic Database Design—a Standardized Data Modeling is used to represent all applications and GUI objects which allows search, data entry, and database distribution tools to be operated on every application without modification.

The Information Transfer Network system architecture is based on a unique 4-Tier model architecture system that allows third-party components to be integrated in a plug-and-play fashion. This architecture allows the Information Transfer Network system to use different GUI and multimedia interfaces, distribute software and information over the network, and to interact with third party applications and databases. The Information Transfer Network system uses Object Oriented Design (OOD/OOP) that is a modern software development methodology that uses a component based system, which enables reuse and re-purposing of functions.

The first tier, the Presentation tier system, resides on the client machine. The other tier systems may also reside on the client machine, on a single server, or across multiple servers over the network. Tiers can be duplicated on multiple servers for security, load balancing and optimization of system performance. The separation of these functions into tiers enables the system to adapt to different environments find technology standards. For example, the Presentation Tier system can adapt itself for use by a home PC user (Internet), or specialized terminals.

Presentation Tier (Thin client)

The presentation tier of FIG. 5 uses a thin-client methodology, containing only minimal functions required to display the graphical user interface (GUI) and the drivers for essential internal devices (sound card, video card, network card, etc.). All advanced interface features, business logic, and services, are loaded onto the client dynamically on system demand. The intelligence that the client has at any moment varies according to the services demanded by the user. The Presentation Tier system is implemented using Java architecture, and intended to run inside a standard web browser that supports a Java virtual Machine such as the Microsoft Internet Explorer version 3 (IE3) or the Netscape Navigator version 3.

As represented in FIG. 2 the Presentation Tier system passes all requests for information or services through the Request Broker system. The Presentation Tier system can interact with the Request Broker system through the Request Broker Interface using Java, JDBC, CGI, ActiveX, CORBA, HTTP, Network Pipe and other interface protocols.

Java is a commercially available multi-platform Object Oriented language that adheres to the Client/Server model and can run on any machine that has a Java Virtual Machine. Applets of Java which are small pieces of code can be down loaded from the Server side onto the Client side and execute there. A dedicated Javat applet can do the interfacing work between the said Presentation Tier and the Request Broker.

JDBC is an incarnation of the well known Open Data Base Connection ("ODBC") protocol that establishes a standard way of interfacing with different types of databases. The JDBC is the Java flavor of ODBC developed for the Java language.

The Common Gateway Interface ("CGI") is an interfacing concept that runs scripts on the server side that translates the client requests into calls to external programs / applications/ servers.

ActiveX—Is Microsoft's product based upon it's well known Objects interfacing model (OCX) adopted for internet components interfacing. An ActiveX component is actually a piece of code that can run on the client side handling the interfacing protocol with the server.

Common Object Request Broker Architecture ("CORBA") allows applications to communicate with each other no matter where they are located or who created them. CORBA defines an Interface Definition Language (IDL) and the Application Programming Interface that enable client/server object interaction.

Hyper Text Transmission Protocol ("HTTP") is the common protocol in use over the internet. It is used for accessing information on a web site's server by a web browser.

Network Pipe is a dedicated protocol used for streaming data. This Protocol is used when the continuity of the data has to be kept at all times like in a telephone conversation or video clip.

The Presentation Tier is insensitive to the content being presented since the functions required to display material are downloaded as objects with the material. Multiple GUI templates can be created to offer different displays for the same content without duplicating the other tiers. For example, two different client terminals, such as a end-user client terminal and an order entry clerk terminal could display different views of the same content using the same tiers.

To illustrate the flow of information in the information transfer system, the example of a user requesting a video clip for display is described. A user request is accepted by the Presentation Tier and passed to the Request Broker system. The Request Broker system will in turn use the appropriate Request Broker Interface system, which in this example is the Oracle Stored Procedure interface. The Application in this example is an Oracle Stored Procedure which retrieves the required video clip from the database server. Simultaneously, the Request Broker system locates and downloads the required objects (Java Classes) used by the Presentation Tier to display the video clip. The Presentation Tier system then executes the Java Classes to display the video clip.

Request Broker System

The Request Broker system acts as the link between the Applications system and the Presentation Tier system as represented in FIGS. 10 and 11. The Request Broker system interprets the request from the Presentation Tier, locates the appropriate Request Broker Interface server (e.g. Oracle, Lotus Notes, GIS, etc.), passes the request to the server application, receives the results, and returns the results to the Presentation Layer. Because the Presentation Layer interacts with servers only through the Request Broker system, the Presentation Layer does not need to know where or how information or applications are stored. A single Request Broker system can serve multiple applications, or specialized Request Brokers system can be implemented for a single application.

The Request Broker system interfaces to the Applications system (Business Logic) layer using specific protocols for each type of server. For example: information applications will use the Oracle Web Server protocol; Java will be used to connect with servlets (server-side applets). Request Broker system architecture results in an open environment that can integrate new types of servers. For example, a new third-party electronic commerce server that implements SET security can be integrated into the Request Broker system.

A single Request Broker system can handle multiple, simultaneous requests. This allows traffic to be monitored and controlled, and eliminates the need to run a separate process for each request as would be required using the CGI protocol or direct requests from the client terminals to the applications.

To illustrate the flow of information through the Request Broker Tier, the example of a user requesting to see the location of the nearest ATM on a map is described. The Presentation system passes the request to the Request Broker system. Based on the request type, the Request Broker Interface system determines that this request should be passed to the GIS protocol server, which runs this application. The GIS server processes the request and returns the map image (for example, in HTML format or bit map format) to the Request Broker system, which delivers it back to the Presentation system.

Application System (Business Logic System)

The Application system tier contains all of the actual applications and services to be used by the end-user. This Tier may include applications developed specifically for the Information Transfer Network system, or applications from third parties, written in any standard language or with any tool.

Third-party applications that utilize a world wide web interface will interface with the Request Broker system using the World Wide Web Request Broker Interface. Applications that do not utilize a world wide web interface will interface with the CORBA to Java and Java to CORBA Request Broker Interface modules. Thus, the Information Transfer Network system has the ability to incorporate or integrate third-party applications which may run on separate computers or even within legacy systems.

Database System

The Information Transfer Network system uses the industry standard Oracle 7.3 RDBMS engine as the standard for its applications, and iieta data storage (information related to presentation of content through the GUI, explained below in detail). The applications may interact with most standard RDBMS (Informix, DB/2, SQL Server) or non-RDBMS (Xbase, IMS, etc.) Third-party applications may use any database or combination of databases on any platform, as this is transparent to the system.

Databases may be distributed across multiple servers over the network as required to optimize performance. For example, video clips can be considered as part of the same logical database as other content (from the Request Broker system point of view), even though it would be physically located on a specialized video server, or possibly on the client terminal machine. Thus the Information Transfer Network system has the ability to incorporate all types of standard databases, the ability to transparently distribute and redistribute databases and the ability to connect with Legacy systems (including Mainframes).

Java Architecture

The architecture of the present invention is based on object oriented design, developed primarily using Sun Java architecture. Java provides the ability to download objects (classes) as they are required (on demand), which facilitates the thin-client concept. Development systems include Sun Microsystems JDK 1.1.1, Microsoft J++, Symantec Visual CafJ Pro, Borland Jbuilder and Microsoft SDK 2 for Java, and Java Beans. A single Java Bean component can function as a first-class component within a range of applications, including applications developed in Visual Basic, Visual C++, Word, Excel and Internet Explorer.

An Active-X bridge Java Bean will enable the Information Transfer System to incorporate the wide range of available Active-X controls, without relying on its proprietary Active-X/Java COM Object solution.

This invention provides the following Java Packages: a) Dynamic Display Package: which reads the properties and methods of objects to be displayed, and displays them according to these properties; b) Display Package which displays and fully controls an HTML window within a Java page; executes hyperlinks to related content, browses Web sites from within the Java environment using a customized toolbar, controls and filters links to the WWW; c) Internet Optimization Package compression graphic classes for low-bandwidth users; d) Database Connection and Manipulation Package connects to Oracle DB and other databases, searches and retrieve information, and e) Peripheral Support Package which handles Device drivers to communicate with peripherals.

It is contemplated by this invention to include the following,,: a) forms generator that includes off-line tools to scan, OCR, and creates electronic forms, displays forms on-screen, real-time filling of forms with basic validity checking; submitting and processing of form results; Printing of forms (blank or completed); b) Advanced Search Engine: Soundex; Thesaurus; Morphology (example: lingual=language); expand search to WWW; c) Virtual Reality Interface which simulate real world reality in an interactive 3-D world (e.g. a virtual supermarket that a user can "shop in".); Browse the 3-D world, connects between items in the 3-D word to Database items; and d) Advanced multimedia capabilities which include streamed Video and Audio-supports rich video and audio; Full motion Animation—high performance 2.5D animations; Spatial Audio for Java—provides 3D sound Internet Technologies Browser The Information Transfer System thin-client is designed to operate inside any standard web browser with a Java Virtual Machine. The browser may be customized to fully control the GUI, replacing the standard browser buttons, toolbars, and menus with a more user-friendly multimedia GUI that is suitable for mouse or touchscreen use. Using Java Classes, help functions, sounds, and other multimedia capabilities are added to the interface.

Software running within the browser environment communicates with the hardware through a Component Object Model Object (COM Object) that controls device drivers (card reader, coin machine, laserdisc, video camera, etc.) The COM object can interface with and activate Microsoft Active-X controls, such as Net Meeting Video Conferencing. This integration of Java and Active-X may be facilitated through the Java-Active-X Bridge Java Bean, rather than through the COM object. The thin-client can be extended and enhanced using third-party browser plug-ins. This is particularly beneficial for providing enhanced multimedia effects for the GUI, such as Virtual Reality Modeling Language (VRML) for 3-D interfaces.

HTML Manipulation

The of the Information Network System client integrates the Java Classes, which support HTML 3.2 documents for display of Rich Text Format (fonts, colors, point size) and images on-screen. This is essentially a Java-based HITML viewer. The HTML document can contain hyperlinks to related information items within the application, or to related sites on the World Wide Web. Upon linking to a WWW site, the screen displays the site in a frame on the upper portion of the screen, with the Java-based navigation GUI panel interface in a frame on the lower portion of the screen. The GUI is designed to provide the essential functions for Web Browsing in an easy to understand manner, with all browser toolbars and menus removed from the screen. This feature is achieved by first loading a special HTML page which consists of two frames. The lower frame always displays a Java applet containing a multimedia GUI, which fully controls the upper frame, which contains the linked HTML page. This is implemented completely in Java and does not rely on a browser or platform specific API. WWW links can be filtered in order to control or limit access to specific sites. An on-screen keyboard can be used to enter specific URLs through a touchscreen.

Optimization of Network Traffic

In order to move information and applets from server to client in the most efficient manner, a real-time compression techniques is implemented Upon receiving a request, the server determines what type of network connection exists. A fast LAN connection may be sent full quality, uncompressed files including text, images, video, and Java Classes. For slower WAN connections, the server will compress the files in real-time, which will then be transmitted over the net and decompressed at runtime by the client. Each type of information item has a unique compression method, which is most suitable for the specific item. For example, JPEG compression is used for images, CAB or JAR compression is used for Java Classes. The JAR technology is also capable of compressing data information and graphics in addition to the Java classes. For images, compression ratios of 1:10 can be achieved using JPEG, although some information may be lost.

Channel Technology (push)

The current standard for accessing information through the Internet is known as pulling whereby users request specific sites through a Web browser. The sites are then viewed in real-time, as they are loaded. The latest trend for accessing information on the Internet is by the Push technology, which sends information to a users machine automatically. Information may be general purpose content, or specific content based on a profile or set of parameters established in advance by/for the user. Content is delivered as different channels—an analogy to television. Each channel offers different types of content, and the user can specify how often the Channel should be updated. For example, a user could subscribe to a newspaper channel in order receive a customized daily (or more frequent) newspaper based on his/her specific topics of interest.

Integrated Internet Applications

The information Transfer Network can integrate most standard Internet-based applications. User-friendly email clients, newsgroup readers, chat rooms and access to proprietary online services (AOL, CompuServe, MSN, etc.) can all be integrated into specific applications. This level of integration is achieved using Active-X to Java COM bridge, or through a CORBA server to activate remote objects in third-party applications. For example, an application can offer an electronic suggestion box, which will forward suggestions via email to the intended recipient. The HTML interface allows users to surf the Internet within a controlled and filtered environment.

Firewall and Security

A preferred embodiment of the Information Transfer Network system integrates the Firewall solution to secure servers and systems residing on the Internet infrastructure. This allows the system terminals to be networked through the public Internet, or through private Intranets. When connected through an Intranet, the terminals can still offer access to the Internet via a Firewall protected gateway at the server. The Firewall performs two main functions: encrypt data between the client and server when networked through the Internet and control access in and out of the system. SSL secure channel method is used to implement addition security for transaction data.

Network Computer (NC)

The Java-based thin-client can operate on the new N(machines being developed by Sun, Oracle, IBM, and others. The thin-client will be downloaded to the machine and run under the Java OS, the operating system used on many NC's.

Advanced Multimedia and Graphics Technologies

The Information Transfer Network System incorporates full multimedia and graphics capability which include: a) streamed Video and Audio which is delivered from server to client using a streaming approach, which allows the user to view the video while it is downloading (video on demand), rather than download the large video files in full before they can be viewed. The Information Transfer Network system is able to show video clips as part of the interface (in MOV or MPEG format using H.263 standard for video and G723 format for audio); b) Video Conferencing (2-Way Video) which includes simple video Conferencing, including white board, document sharing, audio-only Conferencing, and group Conferencing. Also, video cameras can be used to identify users at a terminal, and as part of applications that may require a photo, such as a Drivers License application; c) Rich Text Format and HTML, d) virtual Reality Modeling Language (VRML) Interface in which 3-D interfaces can emulate real-word situations. For example, a VRML supermarket, which allows a user to stroll the aisles, and place items in a 3-D virtual shopping cart. Cosmo VRML plug-in for displaying 3-D virtual world interfaces is employed. Applications can relate from 3-D items in the virtual world to information items in a database. In the example above, a user could select a grocery item in a 3-D interface and retrieve nutrition information from the database.; e) Geographic Information Systems (GIS) which includes vector and raster maps of the entire United States and other countries. Any address (such as ATM locations) can be geocoded and plotted on a map, and a routing system can produce point-to-point-driving directions to provide transit maps and point-to-point directions.

Advanced Services and Applications

Forms Generator/Processor

The forms generator, provides the ability to scan paper-based forms and convert them to HTML documents using OCR technology. Form blanks are automatically converted to fields that can by typed into. Form-filling will be performed using a Java Applet which provides much more capability than would be available using HTML-based forms. Validation functions can be added to each field to do basic data checking and validation at the client. For example, an account number can be verified by the form processor using a check-digit. Blank or completed forms can be outputted to a printer or form input can be submitted to an application or a database on the server.

Computer-Telephone Integration (CTI)

Server-based software modules to enable users at a terminal to connect into the public switched telephone network and execute phone calls are provided herein which permits users searching for a hotel to connect by telephone directly to the hotel reservation clerk. The CTI application is implemented using Microsoft standard Telephone API (TAPI) running on a Windows NT server with a Dialogic voice/modem card or any other voice/modem card which is Microsoft TAPI compliant. The server side of the application is developed using JTAPI, which is the Java implementation of the TAPI standard.

A two way CTI application where an application can interact with a person on the other line is also contemplated. In this kind of application, the end-user would not speak directly to the hotel. Instead, a server will "speak" using text-to-speech synthesis (DSP), and receive responses using touch-tones (DTMF). The responses will then be converted to messages for display on the end-user's screen, and the session can continue. The main benefit of this system is that it allows users to connect with businesses (e.g. small hotels or bed & breakfasts) that are not computerized, while still allowing the content provider to completely control the transactions. The system can also allow communication to take place across language barriers.

Multilingual Capabilities

The Information Transfer Network system supports multilingual audio and bi-directional text display, including Latin and non-Latin characters. Languages can be switched on-the-fly, even if this requires flipping the screen display as is required when switching from English to another language, for example Spanish, French, German and Hebrew. Multilingual technology through special Unicode character sets that can be controlled by Java Classes on Windows-based machines (support for non-Windows machines is forthcoming.) The Dynamic Presentation Generator (described in detail below) allows nearly unlimited support for multiple languages within an application.

Authoring and Data Entry Tools

Rapid Application Development (RAD) tools for building self-service applications are provided for herein. The RAD contains a set of tools that enable non-programmers to design, build and administrate complete applications, which include a GUI, interactive features, data modeling, and content management. Every application data model and GUI is modeled as a set of objects that have properties (attributes), methods (actions that are made during the user interaction), and links to other objects to which they relate. This is the META data of the application, which is the data that describes the application structure.

When an application is running, all the objects which contain the current GUI interaction are loaded dynamically to the presentation tier, and display themselves according to their own display methods. When a user makes an action (like pressing a button), the appropriate Object Method is activated, which may then activate another object (e.g. display a screen, play a video, run search, etc.).

Building an application involves several simple steps: a) Choosing a graphic template (buttons, backgrounds, logos, etc.) from a library; b) Defining the data Objects, Properties, and Actions that implement the application (GUI and user interactions. For example, when the application uses buttons, one has to define the button shape, color, x,y coordinates and actions that are executed when the button is pressed; c) Linking the related object. For example, when you press button (which is an object) then you display a video clip (another object); and d) Storing the application model in the generic database model.

At runtime, the dynamic presentation generator reads all the GUI objects of the application from the database model and displays them accordingly. Reflection—During Runtime, allows the application to identify every Object Type (loaded dynamically) and get information about the Object's capabilities and links to other Objects. Transparent Canvas—Allows display of objects without interfering with background objects or displayed objects.

The data entry tool enables insertion and management of content and classification data that relates to the application. It is a completely visual tool that visually browses the classifications and data. Once the data updates are inserted, the systems distribution tools will distribute all the information to the appropriate databases, according to the optimization algorithm (see details at database technology section).

Database Technologies

Generic Database Design: the Information Transfer Network allows application data and GUI to be described as a set of Objects that have Properties (attributes), Methods (actions), and links (connections to other objects). A unique generic database model can model, store, and manipulate the Objects, Methods, Properties, and object links of any type of application data model. The generic model also stores Meta Data, which is used to describe the way to display and interact with the GUT of the application.

Example of using the Generic Model to implement a Company's data system

This example is an abstract of a database model for the Information Transfer Network. Two main classifications are shown: Computers and Food Within each classification, there are associated companies: G, M, and I, Each Company has products: Multimedia Stations, Terminals, etc.

Tables 1 of FIG. 10 and Table 2 of FIG. 11 show the "Meta Data" which describes the Object Types, Properties, and Link Types. Table 3 of FIGS. 12a through 12c shows sample data filled into the model established in Tables 1 and 2. FIG. 13 is an Illustration of the classification tree and associated data items of the example described above.

This model permits many different applications to share a common database design, allowing the same search and statistical analysis tools to be used within any application without modification. Therefore, the database design, search, data entry, and statistics tools are independent of the content being represented.

Dynamic Distribution

Application databases (which contain information, pictures, video, etc.) can be distributed and replicated across the network in order to optimize overall system performance. Due to the frequently changing environment in application and information demand, communication bandwidth, and the facilities in the station, information can be redistributed across the network. For example, if there is high demand for a certain video clip, this clip could be distributed for storage on a server near the terminal, or even on the terminal hard drive.

The decision of where and how to distribute databases is made by an intelligent algorithm that analyzes all system parameters and determines the distribution that will achieve maximum performance. Based on the algorithms, the distribution is performed.

Although the database may be distributed across multiple servers or terminals, the applications sees it as one logical database. Therefore, the application does not need to be modified upon changes in the database distribution.

The following paragraphs describe the process and parts that comprise the dynamic distribution and system optimization systems.

Statistical Analysis

Every operation (menu choices, coordinates of screen touches) within applications is recorded in a database table for future analysis. This data can then be analyzed using statistical analysis tools, including Oracle tools in order to understand usage patterns, and to make system refinements. Usage patterns, such as printer usage can be analyzed to predict when the printer will run out of paper.

Example: The effectiveness of the GUI design can be measured based on an analysis of screen touches. Popular items and services can be measured by hour, day, location, etc.

On every user operation and some of the system's activities a text entry is added into a log file that records the statistics. Each entry line records the time & date stamp of the action, the type of action and some general system status information that will help to decode the action recorded in relation to the system's operation status. The log file is transmitted to the control and management system on pre-defined schedules or on a specific request from the control and management system. The said log file can then be analyzed and maintenance, corrective or improvements decisions can be made. Other type of information that can be also be driven out of the log file, like specific application's parts usage, user interface parts usage and more.

Systems Management Tools

The Information Transfer Network system is a large, complex, changing, non-deterministic network, handling massive amounts of information, transactions, and services. To manage this network, Optimized Integrated System Management Architecture (OISMA) which has the following capabilities: a) consolidate ONE central console that monitors all system components; b) ability to distribute regional and functional specific consoles; c) problem Alerts/malfunctions of system B different severity alerts, different kinds of alerts (pager, fax, sound, send messages to subcontractor system, etc.); d) automatic recovery actions to recover from problems; e) ability to takeover any station and execute commands from distance; f) help desk tools to report, track and analyze problems on system; g) transaction management B tracks and manages the flow of system transactions, h) usage patterns and statistics; I ) network inventory autodetect and control B plug-and-play installation of components will be automatically recorded to inventory; j) hardware/Software version and configuration control; k) preventive Maintenance Management and l) Central backup.

Systems Management Technologies

Simple Network Management Protocol (SNMP)—Framework of OISMA, enables agents across the network to communicate with central management tools.

Integration of management tools into 4-Tier Architecture: Each tier will have agents that receive orders, collect data, and report back to the management system.

Integration of third-party SNMP agents: Agents for specific software (e.g. Oracle Database), hardware devices, or operating systems.

Software and Information Deployment and Synchronization: Oracle tools, SMS, and other tools for distribution and synchronization HP OpenView Network Management Framework—GS intends to integrate this set of network and hardware management tools.

Network Control and Management

Commercially available control and management systems such as the Trivoli system from IBM and the SMS system from Microsoft may be used in the information transfer network.

System Optimization

The purpose of the System Optimization is to provide the best service on all terminals over time. Best Service includes, fast response time, availability of services and peripherals (printer, network, etc.), appropriate adaptation to terminal capabilities (e.g. home PC with low-bandwidth, machine without video capability, etc.) Optimization is achieved by: a) Measuring Static Parameters—Hardware and peripherals on terminals (memory, type of network connection, etc.); b) monitor Dynamic Parameters—Current available bandwidth, server utilization, location and nature of data, location of selected application or service, etc; c) tracking Historic Performance—Over time, the system generated performance statistics for use in optimization, d) analyzing Parameters and Make Decisions—Algorithms are used to make two types of optimization decisions) real Time Decisions—Performed at runtime to determine how best to fulfill user requests; and f) automated Decisions—Performed continuously, or at preset schedules to redistribute applications and content across the network.

The embodiments described above are illustrative examples of the present invention. It is to be understood that the present invention is not limited to these particular embodiments. Various changes may be effected by one skilled in the art without departing from the spirit and scope of the invention as defined in the appended claims.

What is claimed is:

1. A system for transferring executable application data over a network comprising:

a plurality of client terminals connected to the network;

a plurality of servers connected to the network;

a management system connected to said network for monitoring and storing characteristic data, said characteristic data comprising data descriptive of physical resources associated with execution of application data at said plurality of client terminals, and said management system including a plurality of application databases for storing executable application data; and an interfacing system connected to said network for dynamically distributing said executable application data stored in said application databases between said servers and said terminals as a function of said characteristic data, wherein at least a portion of said executable application data is stored at said client terminals, and a portion of said application data resides at said servers, said portion stored at each of said client terminals being dependent on each client terminal's characteristic data.

2. The system of claim 1 wherein each of said client terminals is one of a personal computer, an organization personal computer, and a stand-alone terminal.

3. The system of claim 2 wherein said stand-alone terminals further comprise hardware for executing one of loading smart cards, reading magnetic cards, and processing video-graphics.

4. The system of claim 1 wherein each of said servers are one of an information server, a transactional server, and an external server.

5. The system of claim 4, wherein said transactional server is operable to perform one of a financial transaction and a personal transaction.

6. The system of claim 1 wherein said network is one of a LANnet, a WANnet, the Internet and an Intranet.

7. The system of claim 1, wherein said network is a four tier model.

8. The system of claim 1, wherein said network further comprises a graphical user interface for displaying a portion of said data on said client terminals.

9. The system of claim 1, wherein the system is operable to interact with a plurality of third party applications.

10. The system of claim 1, wherein said interfacing system is a request broker system.

11. The system of claim 1, further comprising a telecommunications device connected to said network for accessing said data from said servers.

12. The system of claim 1, wherein said characteristic data is one of a plurality of static or dynamic parameters associated with each of said client terminals and a usage pattern associated with said terminals.

13. A method for transferring executable application data over a network comprising providing a plurality of client terminals;

providing a plurality of servers;

establishing a data communication between said client terminals and said servers;

generating a database of characteristic data and application data associated with said client terminals and servers, said characteristic data comprising data descriptive of physical resources associated with execution of application data at said client terminals; and dynamically distributing said database of executable application data between said client terminals and said servers as a server-determined function of said characteristic data, wherein a portion of said executable application data resides at said client terminals and a portion of said executable application data resides at said servers, said portion stored at each of said client terminals being dependent on each client terminal's characteristic data.

14. The method of claim 13, further comprising providing each of said servers as one of a transactional server, an information server, and an external server.

15. The method claim 14, further comprising performing one of a financial transaction and a personal transaction.

16. The method of claim 13, further comprising providing said client terminals with hardware for one of loading smart cards, reading magnetic cards, and processing videographics.

17. The method of claim 13, wherein each of said client terminals are one of a personal computer, an organizational computer, and a stand-alone terminal.

18. The method of claim 13, further comprising providing a graphical user interface to display data on said client terminals.

19. The method of claim 13, wherein the network is one of a WANnet, LANnet, Internet, and an Intranet.

20. The method of claim 13, wherein said establishing step further comprises loading an application onto one of said terminals and establishing said data communication as a function of specifications of said application.

21. The method of claim 13, further comprising a telecommunications device connected to said network for accessing data from said servers.

22. The method of claim 13, wherein said characteristic data is one of a plurality of static or dynamic parameters associated with each of said client terminals and a usage pattern associated with said terminals.

23. The method of claim 13, wherein said network is a four-tier model.

24. The method of claim 13 wherein dynamically distributing comprises distributing different application data to different client terminals depending on the physical resources associated with each of the client terminals.

25. A computer-based method of processing information dynamically between a plurality of client terminals and a plurality of servers comprising:

establishing a data communication path between said client terminals and said servers;

generating a database of characteristic data and executable application data associated with said client terminals and servers, said characteristic data comprising data descriptive of physical resources associated with execution of application data at said client terminals, and dynamically distributing said database of executable application data between said client terminals and said servers as a function of said characteristic data, wherein a portion of said executable application data resides at said client terminals and a portion of said executable application data resides at said servers, said portion stored at each of said client terminals being dependent on each client terminal's characteristic data.

26. The method of claim 25, further comprising providing each of said servers as one of a transactional server, an information server, and an external server.

27. The method of claim 26, further comprising performing one of a financial transaction and a personal transaction.

28. The method of claim 25, further comprising providing said client terminals with hardware for one of loading smart cards, reading magnetic cards, and processing videographics.

29. The method of claim 25, wherein each of said terminals are one of a personal computer, an organizational computer, and a stand-alone terminal.

30. The method of claim 25, further comprising providing a graphical user interface to display data on said client terminals.

31. The method of claim 25, wherein the network is one of a WANnet, LANnet, Internet, and an Intranet.

32. The method of claim 25, wherein said establishing step further comprises loading an application onto one of said terminals and establishing said data communication as a function of specifications of said application.

33. The method of claim 25, further comprising a telecommunications device connected to said network for accessing data from said servers.

34. The method of claim 25, wherein said characteristic data is one of a plurality of static or dynamic parameters associated with each of said client terminals and a usage pattern associated with said terminals.

35. The method of claim 25, wherein said network is a four-tier model.

36. The method of claim 25 wherein dynamically distributing comprises distributing different application data to different client terminals such that a portion of said application data residing at each client terminal is different depending on the physical resources associated with each client terminal.

37. A computer program residing in a computer-readable medium, comprising instructions for causing a computer system to:

establish a data communication path between a plurality of client terminals and a plurality of servers;

generate a database of characteristic data and executable application data associated with said client terminals and said servers, said characteristic data comprising data descriptive of physical resources associated with execution of application data at said client terminals; and dynamically distribute said executable application data between said client terminals and said servers as a function of said characteristic data, wherein a portion of said executable application data resides at the client terminal and a portion of said executable application data resides at said servers, said portion stored at each of said client terminals being dependent on each client terminal's characteristic data.

38. The computer-readable medium of claim 37 wherein the instructions to dynamically distribute comprise instructions to distribute differently depending on the physical resources associated with each client terminal.

* * * * *